Aug. 7, 1962
E. L. STOGRYN ETAL
3,048,531
RADIOCHEMICAL SULFONATION REACTION
Filed Jan. 13, 1958
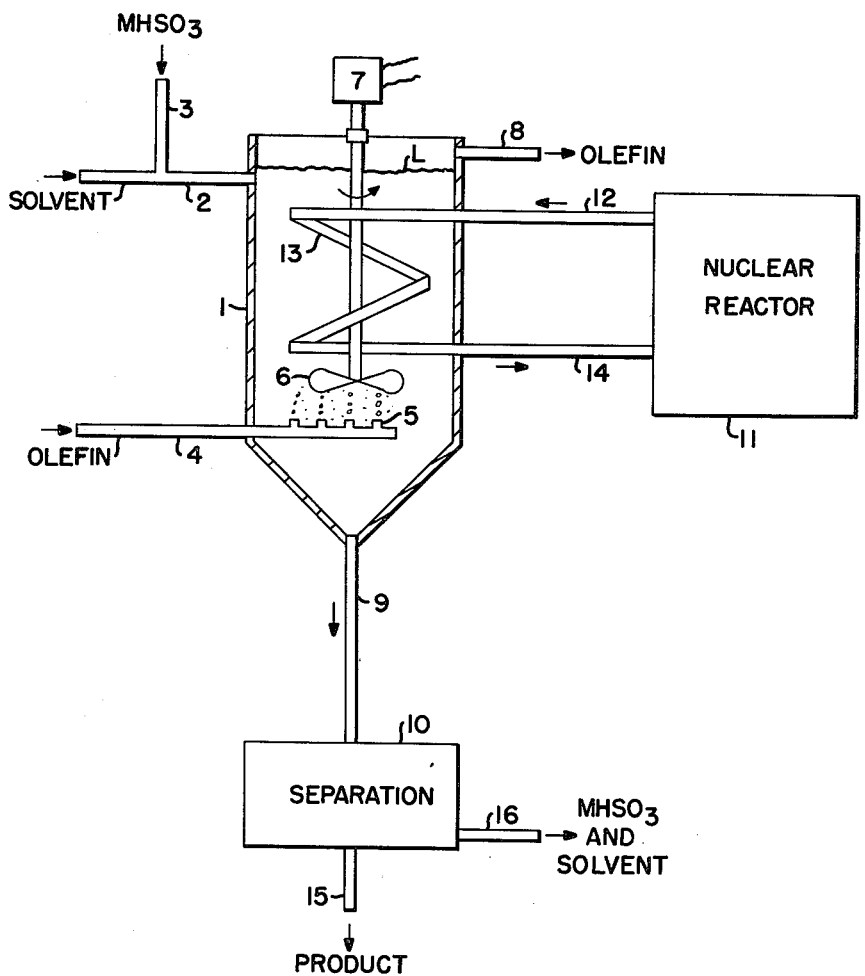
Eugene L. Stogryn
Perry A. Argabright
Inventors
By L. A. Strimbeck
Attorney 3,048,531
RADIOCHEMICAL SULFONATION REACTION
Eugene L. Stogryn, Fords, and Perry A. Argabright, Nixon, N.J., assignors to Esso Research and Engineering Company, a corporation of Delaware
Filed Jan. 13, 1958, Ser. No. 708,587
6 Claims. (Cl. 204—162)

This invention pertains to the radio-sulfonation of Type I olefins.

In brief compass, this invention proposes a radiochemical process which comprises forming a mixture of a Type I olefin and a bisulfite of the formula $MHSO_3$ and then irradiating the mixture with electromagnetic radiation having a wave length in the range of $10^{-3}$ to $10^2$ A., until in the range of 2 to 50 megaroentgens of radiant energy have been absorbed. By this means there is obtained a salt of an organic sulfonate having the formula $(RCH_2CH_2SO_3)_xM$, wherein R is an alkyl group having in the range of 1 to 30 carbon atoms, M is an alkali metal, alkaline earth metal or ammonium radical, and $x$ is the valence of M.

In a preferred embodiment of this invention, a solvent is used to promote contacting between the two reactants. A mutual solvent can be used, but a solvent for just one of the reactants is also satisfactory such that a liquid-liquid heterogeneous system is obtained. In a heterogeneous system it is also preferred to use dispersing agents for the non-solubilized reactant in order to increase its effective concentration.

The reaction products of this invention are useful per se, e.g., as detergents in lubricating oils or as surfactants. They are also useful as intermediates in organic syntheses, as in the manufacture of drugs and dyes, e.g., the metal salt can be converted to the free acid.

The radiochemical sulfonation reaction of this invention proceeds readily and surprisingly high yields are obtained, the yield usually being above 20 mole percent on olefin. The radiant energy requirement is surprisingly modest. It is believed that a chain reaction occurs. The radiant energy is believed to induce the formation of a $\cdot SO_3^-$ free radical chain carrier from the bisulfite which reacts as follows:

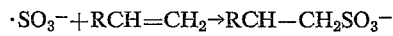
$\cdot SO_3^- + RCH=CH_2 \rightarrow RCH-CH_2SO_3^-$

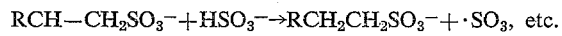
$RCH-CH_2SO_3^- + HSO_3^- \rightarrow RCH_2CH_2SO_3^- + \cdot SO_3$, etc.

This invention is not, of course, to be limited by this theory.

The olefin reactants of this invention is a type I olefin of the formula: $RCH=CH_2$ wherein R is an alkyl radical having from 1 to 30 carbon atoms. Alkali and alkaline earth metal, and ammonium bisulfites can be used as the other reactant.

Under suitable conditions, the reactants can be admixed directly, in the absence of solvent, to form the reaction mixture. It is preferred, however, to use in the reaction mixture at least 50 weight percent of a material that is a solvent for one of the reactants. Preferred are polar solvents characterized by water, N,N-dimethylformamide, acetone and methylethylketone. Mutual solvent systems in which both the olefin and bisulfite are soluble can also be used. Examples of mutual solvents are: acetone-benzene, acetone-hexane, water-pyridine, acetone-pyridine, dioxane-water and tetrahydrofuran-water.

It is advantageous to use with two phase systems dispersants such as: alkarylsulfonates, quaternary ammonium compositions, alkarylpolyether alcohols, aliphatic nonionic polyoxyethylene ethers, and fatty acid amide esters. These dispersants are used in an amount in the range of 1 to 5 weight percent in the reaction mixture.

The radiation used to bring about the reaction according to this invention is electromagnetic radiation having a wave length in the range of $10^{-3}$ to $10^2$ A. This includes both X-rays and gamma rays. This radiation can be obtained from any convenient source as from conventional X-ray machines; from waste materials from nuclear reactors, e.g., spent fuel elements; from shielded nuclear reactors; or from materials especially made radioactive by insertion in a nuclear reactor, e.g., cobalt 60.

The reaction mixture is exposed to the radiation in any convenient manner to obtain the desired dose rate and for a time to obtain the desired dose. Either continuous or batch methods are satisfactory. If the reaction mixture is a heterogeneous one, it is preferred to agitate the mixture during irradiation. This can be accomplished by suitable agitation means such as air stirrers, electric stirrers, shakers, dispersators, power driven dashers, and bubblers.

This invention will become clear from the following description of the drawing attached to and forming a part of this specification.

The drawing schematically illustrates a process designed according to this invention.

In the drawing, reaction vessel 1 is supplied with solvent, e.g., acetone-hexane, by line 2. Line 3 supplies the bisulfite to line 2, the bisulfite then being carried into reactor 1 by the solvent. At the base of reactor 1 a line 4, ending in a perforated discharge nozzle arrangement 5, supplies the olefin, e.g., a mixture of olefins boiling in the range of 275 to 350° C. obtained by the steam cracking of paraffin waxes having 24 to 40 carbon atoms per molecule. A body of liquid having a level L is maintained in reaction vessel 1 and the olefin bubbles up through the liquid. To assure intimate mixing of the olefin, solvent, and bisulfite, the reaction mixture is agitated by an agitator 6 driven by motor 7. Unreacted olefin is removed from the upper portion of the reactor 1 by line 8, and the solvent containing unreacted bisulfite and the sulfonate reaction product is removed by line 9 and passed to separation zone 10.

The requisite radiant energy in this example is supplied by an indium sulfate solution system, although other means could well be used. The indium sulfate solution is irradiated in nuclear reactor 11 and then is passed in a relatively short period of time by line 12 through a coil system 13 in reactor 1. It is then returned from coil 13 by line 14 to the nuclear reactor to be reactivated. Such an indium sulfate solution system to obtain electromagnetic radiation is known to the art and need not be further described.

The material in separation zone 10 is separated as desired. Separation zone 10 can encompass more than one separation stage. Such means as a settling tank accompanied by a coalescer, extraction, filtration or precipitation units can be used depending on the nature of the sulfonate. The reaction product is removed from separation zone 10 by line 15. Unreacted bisulfite and solvent are removed by line 16 and can be recycled if desired to line 2.

Table I conveniently summarizes the range of operating conditions applicable to this invention and presents a specific example thereof, particularly with reference to the process illustrated in the drawing.

TABLE I

|  | Range | Example 1 |
|---|---|---|
| Olefin | Type I, alkyl | n-butene-1. |
| Bisulfite | Alkali and alkaline earth metal, and ammonium. | LiHSO₃. |
| Solvent | Polar | H₂O. |
| Concentration [1]: |  |  |
| Olefin, wt. percent | 5 to 50 | 10. |
| Bisulfite, wt. percent | 5 to 50 | 15. |
| Bisulfite/Olefin, Mole/Mole | 1 to 10 | 1. |
| Solvent, wt. percent | 50 to 85 | 75. |
| Temperature, °C | 0 to 90 | 25. |
| Time, hrs | 2 to 72 | 24. |
| Electromagnetic Radiation: |  |  |
| A | $10^{-3}$ to $10^2$ | Approx. $10^2$. |
| Source |  | Indium Sulfate Sol. |
| Dose rate, megaroentgens/hr. | 0.1 to 10 | 0.25. |
| Dose, megaroentgens | 1 to 50 | 6. |
| Yield,[2] mole percent on olefin | 5 to 75 | 25. |

[1] Present at any one time, on the average, in the reaction mixture.
[2] As salt.

Example 2

The radiation for this example was obtained from an artificially produced cobalt 60 source in the form of a hollow 2-inch pipe having a rating of about 2400 curies. A reaction mixture was made up comprising 11 weight percent of sodium bisulfite, 9 weight percent of n-hexene-1, and 80 weight percent water. During the irradiation, this reaction mixture was contained in a 3-neck round-bottom flask, fitted with a reflux condenser, a nitrogen inlet, and an air-driven paddle stirrer. The flask was placed sufficiently close to the source to obtain a dose rate of 0.1 megaroentgen per hour. A nitrogen atmosphere was maintained in the container, and the temperature was 25° C. The irradiation was continued for 20 hours until 2.1 megaroentgens of gamma radiation had been absorbed.

The reaction product was isolated by extraction with aqueous isopropyl alcohol following an ASTM procedure. A 34 weight percent yield of white sodium hexane sulfonate was obtained. The G value (molecules of product per 100 electron volts absorbed) was 194, indicating a chain reaction.

Comparative Example 1

A duplicate of Example 2 was run, except that the reaction mixture was not irradiated. The yield of the sulfonate was only 10.1 weight percent.

Having described this invention, what is sought to be protected by Letters Patent is succinctly set forth in the following claims.

What is claimed is:

1. A radiochemical process which comprises forming a mixture containing at least 5 weight percent of an olefin having the formula RHC=CH₂, wherein R is an alkyl group having 1 to 30 carbon atoms, and a bisulfite having the formula $M(HSO_3)_x$ wherein M is a radical selected from the group consisting of alkali metal, alkaline earth metal and ammonium radicals, and $x$ is the valence of M, the molar ratio of said bisulfite to said olefin being in the range of 1 to 10, irradiating said mixture with an artificially produced electromagnetic radiation having a wave length in the range of $10^{-3}$ to $10^2$ A. until about 1 to 50 megaroentgens have been absorbed, the irradiation being carried out at a temperature in the range of 0 to 90° C. and at a dose rate in the range of 0.1 to 10 megaroentgens per hour, and obtaining a sulfonate addition product having the formula $(RCH_2CH_2SO_3)_xM$ in a yield of at least 20 mole percent, based on said olefin.

2. A radiochemical process which comprises forming a mixture containing at least 5 weight percent of an olefin having the formula RHC=CH₂, wherein R is an alkyl group having 1 to 30 carbon atoms, and a bisulfite having the formula $M(HSO_3)_x$ wherein M is a radical selected from the group consisting of alkali metal, alkaline earth metal and ammonium radicals, and $x$ is the valence of M, the molar ratio of said bisulfite to said olefin being in the range of 1 to 10, irradiating said mixture with gamma radiation until about 1 to 50 megaroentgens have been absorbed, the irradiation being carried out at a temperature in the range of 0 to 90° C. and at a dose rate of 0.1 to 10 megaroentgens per hour, and obtaining a sulfonate addition product having the formula $$(RCH_2CH_2SO_3)_xM$$

in a yield of at least 20 mole percent, based on said olefin.

3. The process of claim 2 wherein the reaction mixture comprises at least 50 weight percent of a polar solvent.

4. The process of claim 2 wherein at least 50 weight percent of said mixture comprises a mutual solvent for said olefin and bisulfite.

5. A radiochemical process which comprises forming a mixture containing an olefin having the formula RHC=CH₂, wherein R is an alkyl group having 1 to 30 carbon atoms, a polar solvent and an alkali bisulfite, the molar ratio of said bisulfite to said olefin being in the range of 1 to 10, irradiating said mixture with gamma radiation until about 1 to 50 megaroentgens have been absorbed, the irradiation being carried out at a temperature of 0 to 90° C. and at a dose rate of about 0.1 to 10 megaroentgens per hour, and recovering from the irradiated mixture a sulfonate addition product in a yield of at least 20 mole percent, based on said olefin.

6. A radiochemical process which comprises forming a mixture of 11 weight percent sodium bisulfite, 9 weight percent n-hexene-1, and 80 weight percent water, agitating and irradiating said mixture with radiation obtained from a cobalt 60 source at a rate of about 0.1 megaroentgen per hour until about 2.1 megaroentgens of radiation have been absorbed, and recovering from the irradiated mixture about 34 weight percent of white sodium hexane sulfonate.

References Cited in the file of this patent

UNITED STATES PATENTS

| 2,727,057 | Park | Dec. 13, 1955 |
| 2,743,223 | McClinton et al. | Apr. 24, 1956 |

FOREIGN PATENTS

| 708,901 | Great Britain | May 12, 1954 |

OTHER REFERENCES

Martin: "Chem. and Eng. News," vol. 33, No. 14, pages 1424–1428, Apr. 4, 1955.

"Ind. and Eng. Chem.," vol. 50, No. 9, Part II, pages 1406–1413, September 1958.